S. I. HITCHCOCK.
MUD GUARD.
APPLICATION FILED SEPT. 21, 1912.

1,099,441.

Patented June 9, 1914.

Witnesses:
Grace A. Marvin.
C. A. Krey

Inventor:
Stanley Isaiah Hitchcock,
by Fraser Luck & Myers
Attys.

UNITED STATES PATENT OFFICE.

STANLEY ISAIAH HITCHCOCK, OF UPPER NORWOOD, ENGLAND, ASSIGNOR OF ONE-THIRD TO REGINALD EATON ELLIS, OF LONDON, ENGLAND.

MUD-GUARD.

1,099,441.      Specification of Letters Patent.      Patented June 9, 1914.

Application filed September 21, 1912. Serial No. 721,700.

*To all whom it may concern:*

Be it known that I, STANLEY ISAIAH HITCHCOCK, a subject of the King of Great Britain and Ireland, and residing at 1 Troy road, Upper Norwood, in the county of Surrey, England, mechanical engineer, have invented certain new and useful Improvements in Mud-Guards, of which the following is a specification.

This invention relates to an improved form of mud guard for the wheels of motor vehicles and the like.

Mud guards as generally used consist of a semi-circular or flat shaped portion of metal, celluloid, or the like fixed over the upper portion of the wheel. When a motor-car or omnibus is running over muddy roads the tires as they make contact with the road cause the mud to be deflected at an angle as well as to carry a certain amount around with them. This mud carried around is trapped by the present type of guard but that deflected is not arrested and consequently is driven on to the pavements and the passers by.

Now the object of the present invention is to construct a guard which shall be capable of collecting the mud as it is deflected by the tires from the road.

In the accompanying drawings: Figure 1 is a front elevation of a wheel fitted with my improved form of mud-guard. Fig. 2 is an end view of Fig. 1. Fig. 3 is a sectional end view of the mud-guard and Figs. 4, 5, 6 and 7 are modifications.

One form of mud-guard which is illustrated by Figs. 1, 2 and 3 consists of a cone-shaped ring $a$ of metal or the like slightly smaller than the diameter of the tire $b$ and connected to the hub $c$ of the wheel by means of springs $d$ and fittings or brackets $e, f$. The outer portion of the guard may be formed plain as in Figs. 1, 2 and 3 or with a rolled and beaded edge $g$ as shown in Figs. 4, 5, 6 and 7, in order to strengthen the same. The angle or space between the guard and the tire forms the trap for the mud or the like.

The springs $d$ interposed between the guard $a$ and the hub of the wheel are provided so that when pneumatic tires are used and they are punctured or running on to the curb of the pavement, walk or the like takes place the guard $a$ shall give thereby preventing any damage to the same.

In the modification illustrated by Fig. 5, the inner flanged edge of the ring indicated by the letter $h$ is prolonged and turned radially outward as at $i$, thereby forming a wall preventing the mud from being projected on to the body of the wheel.

If it is desired the springs $d$ may be inclosed by casings so as to keep them free from mud or the like, and if required the springs $d$ may be arranged in other convenient ways as long as they support the ring in the manner described.

Figure 1:
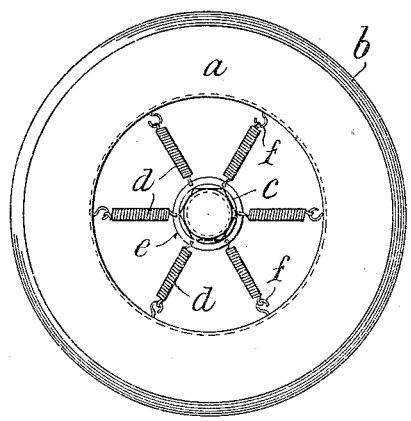
Figure 2:
Figure 3:
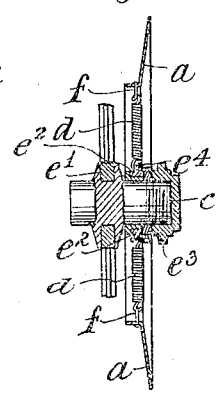
Figure 4:
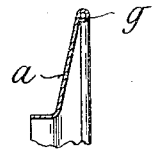
Figure 5:
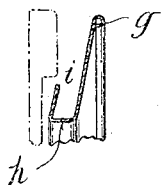
Figure 6:
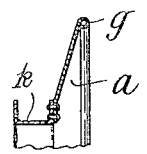
Fig. 6 illustrates a further modification. In this construction the ring of metal forming the guard is riveted or otherwise secured to a U-shaped or other suitable section of metal $k$ which in turn is connected by springs and fittings as shown in Figs. 1 and 3 to the hub or other suitable portion of the wheel.
Figure 7:
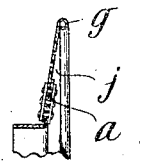
Fig. 7 is similar in construction to Figs. 1 to 4 except that the portion $j$ of the guard is formed of rubber or other flexible material secured to the main portion of the guard $a$ by rivets and washers or other suitable means.

The fitting $e$ to which the lower portions of the springs are attached as illustrated more particularly in Fig. 3, consists of a flanged collar $e'$ driven tightly on to the hub and on to this collar is placed the spring-holder $e^2$ which is rotatively mounted on the hub so as to allow it to be free thereon and the collar $e^3$ fitted with set-screws $e^4$ to keep it in position. These mud-guards may if desired be fitted to both sides of the wheels.

It will be readily understood that the ring which may be of flat, coned, dished, or like shape, is in such close proximity to the road that immediately the mud is deflected it strikes the inside surface of the same and is thereby arrested and prevented from going on to the pavement or the passers by. By cone-shaped I mean a ring of metal at an angle to the tire. The ordinary mud-guard may be used in conjunction with this improved form in order to trap any mud carried to the upper portion of the wheel.

What I claim as my invention, and desire to secure by Letters Patent, is:—

1. A mud guard comprising a cone-shaped ring slightly smaller than the diameter of the tire on the wheel to which it is fitted, a flanged extension from the inner edge of said ring, the said flange projecting axially of the wheel, and then radially outward so as to form an annular channeled portion around the inner edge of the said cone-shaped ring, a central fitting adapted to be connected to the hub of a wheel, springs radially disposed and connecting the inner edge of the said ring to the said central fitting, whereby the said ring is resiliently supported.

2. A mud guard comprising a ring slightly smaller than the diameter of the tire on a wheel to which it is fitted, a central fitting and radially disposed springs extending from the inner edge of said ring to said central fitting, said mud guard being attached to said wheel through the intermediary of said central fitting, and means for rotatively securing said fitting in place on and relatively to the axle of the wheel.

In witness whereof, I have hereunto signed my name in the presence of two subscribing witnesses.

STANLEY ISAIAH HITCHCOCK.

Witnesses:
ALFRED B. CAMPBELL,
HENRY SPENCER.